(12) United States Patent
Futterer

(10) Patent No.: US 11,675,426 B2
(45) Date of Patent: Jun. 13, 2023

(54) MEASUREMENT METHOD AND DEVICE FOR PERFORMING THE MEASUREMENT METHOD

(71) Applicant: SEEREAL TECHNOLOGIES S.A., Munsbach (LU)

(72) Inventor: Gerald Futterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 67 days.

(21) Appl. No.: 14/361,743

(22) PCT Filed: Dec. 3, 2012

(86) PCT No.: PCT/EP2012/074289
§ 371 (c)(1),
(2) Date: May 30, 2014

(87) PCT Pub. No.: WO2013/079727
PCT Pub. Date: Jun. 6, 2013

(65) Prior Publication Data
US 2014/0327612 A1 Nov. 6, 2014

(30) Foreign Application Priority Data
Dec. 2, 2011 (DE) .................. 10 2011 055 967.1

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 30/26* (2020.01); *G01S 5/16* (2013.01); *H04N 13/366* (2018.05)

(58) Field of Classification Search
None
See application file for complete search history.

(56) References Cited

U.S. PATENT DOCUMENTS 4,973,149 A * 11/1990 Hutchinson .................. 351/210
6,578,962 B1 * 6/2003 Amir .................. G06K 9/0061
345/157

(Continued)

FOREIGN PATENT DOCUMENTS

EP 0821908 A1 2/1998
EP 2236074 A1 10/2010
(Continued)

OTHER PUBLICATIONS

International Search Report, dated Feb. 21, 2013, and Written Opinion, issued in International Application No. PCT/EP2012/0740082.

*Primary Examiner* — Stephen T. Reed
(74) *Attorney, Agent, or Firm* — Saul Ewing LLP

(57) ABSTRACT

The present invention relates to a measurement method in which, by predetermined illumination by means of a display device, in particular a holographic or autostereoscopic display device, with an intensity distribution of the illumination light in a plane of a light source image, a first location of an object, in particular an observer of the display device, is marked, and wherein the relative position of the first location in relation to a second location of the object is determined in a coordinate system of a camera.

18 Claims, 4 Drawing Sheets

(51) Int. Cl.
 *G02B 30/26* (2020.01)
 *G01S 5/16* (2006.01)
 *H04N 13/366* (2018.01)

(56) References Cited

U.S. PATENT DOCUMENTS

| | | | |
|---|---|---|---|
| 7,027,659 | B1 * | 4/2006 | Thomas ............. H04N 13/0003 |
| | | | 348/E13.008 |
| 7,538,744 | B1 | 5/2009 | Liu et al. |
| 7,809,160 | B2 * | 10/2010 | Vertegaal ............... A61B 3/113 |
| | | | 345/157 |
| 2004/0174496 | A1 * | 9/2004 | Ji et al. ........................ 351/209 |
| 2006/0110008 | A1 * | 5/2006 | Vertegaal et al. ............. 382/103 |
| 2010/0073744 | A1 * | 3/2010 | Zschau ................ G03H 1/0808 |
| | | | 359/9 |
| 2011/0032346 | A1 * | 2/2011 | Kleinberger ....... H04N 13/0404 |
| | | | 348/59 |
| 2011/0096381 | A1 | 4/2011 | Leister et al. |
| 2011/0157339 | A1 * | 6/2011 | Bennett ..................... G06F 3/14 |
| | | | 348/59 |

FOREIGN PATENT DOCUMENTS

| | | |
|---|---|---|
| WO | 01/33323 A2 | 5/2001 |
| WO | 2005/046465 A1 | 5/2005 |
| WO | 2006/066919 A1 | 6/2006 |
| WO | 2009/101238 A1 | 8/2009 |
| WO | 2009/156191 A1 | 12/2009 |
| WO | 2010/149587 A2 | 12/2010 |

\* cited by examiner

MEASUREMENT METHOD AND DEVICE FOR PERFORMING THE MEASUREMENT METHOD

CROSS REFERENCE TO RELATED APPLICATIONS

This application claims the priority of PCT/EP2012/074289, filed on Dec. 3, 2012, which claims priority to German Application No. 10 2011 055 967.1, filed Dec. 2, 2011, the entire contents of each of which are incorporated fully herein by reference.

BACKGROUND OF THE INVENTION

The present invention relates to a measurement method and to an apparatus for carrying out the measurement method.

Display devices which allow observers a genuine spatial, i.e. three-dimensional, perception are becoming ever more popular.

Typically, observers of these display devices require auxiliary means, for example head-mounted displays, lamps, polarization glasses or shutter glasses, in order to be able to three-dimensionally perceive the scenes displayed by the display devices.

Display devices which allow the observers observation without additional auxiliary means are also known. Typically, for these display devices, for example autostereoscopic display devices or holographic display devices, information is required regarding where the observer or observers are situated in relation to the display device.

Conventionally, for this purpose, two cameras which record the space in front of the display device are used. Evaluation units connected to the cameras recognize the face of an observer of the display device and can, in particular, determine the position of the eye pupils of the observer in relation to the position of the cameras. The recording direction of the cameras in relation to the display device is in this case predetermined in a fixed way, so that the position of the eye pupils in relation to the display device can be determined from the position of the eye pupils in relation to the cameras. During transport of the apparatus, it may occur that the position and in particular the orientation of the camera in relation to the display device is altered. Thus, the position of the eye pupils in relation to the display device can no longer be determined accurately, or correctly, and recalibration of the device is necessary.

Furthermore, special apparatuses with which objects can be measured three-dimensionally are known. Typically, in the case of these apparatuses, lines are generated on the object with a laser. Images of the object illuminated with these lines are then recorded with a camera and the shape of the object is calculated from the distortion of the lines and stored as a digital model. In order to provide an observer with the possibility of examining this digital model, however, another digital display device is additionally necessary.

Against this background, it was consequently the object of the invention to provide a measurement method and an apparatus having reduced equipment outlay.

SUMMARY OF THE INVENTION

According to the invention, this object is achieved by the subject-matter of independent patent claims 1 and 15.

Advantageous configurations of the invention are mentioned in patent claims 2 to 14 and 16 to 18 referring back to patent claims 1 and 15.

Thus, the solution to the object consists in a measurement method, wherein by predetermined illumination by means of a display device, with an intensity distribution of the illumination light in a plane of a light source image, a first location of an object, is marked, and wherein the relative position of the first location in relation to a second location of the object is determined in a coordinate system of a camera.

The invention is based on the concept that the display device itself is used as a means for determining the relative position of the first location of the object in relation to a second location of the object. Since the illumination for the display of image information is predetermined by the display device itself, it is possible to determine the position of the first location of the object and, by means of the relative position of the second location in relation to the first location in the coordinate system of the camera, also the position of the second location of the object in the coordinate system of the display device.

Calibration of the camera, that is to say determination of its position and orientation, in relation to the coordinate system of the display device can therefore be dispensed with.

By using a holographic display device, the intensity distribution of the illumination light in the plane of the light source image can be generated by constructive or destructive interference of coherent light beams. In this way, an intensity distribution of the illumination light varying strongly with the distance of the object from the display device can be achieved in a controlled way.

An autostereoscopic display device can be composed of simpler modules than a holographic display device. In particular, autostereoscopic display devices do not require light sources that generate light with a large coherence length, in order to represent three-dimensional scenes. The use of an autostereoscopic display device can therefore make the method simpler.

The marking of the first location of an observer of the display device may above all be advantageous when the display device is intended to interact with the observer. It is, however, also conceivable to mark the first location of an inanimate object so that it can be measured, or can be deliberately illuminated with a texture.

According to a first refinement of the measurement method, the intensity distribution of the illumination light in the plane of the light source image comprises a light source image of a diffraction order.

Display devices typically have a spatial modulator for light with a predetermined raster. The raster of the spatial modulator can be used as a natural diffraction grating with a predetermined grating period, so that the intensity distribution of the illumination light in the plane of the light source image may comprise a light source image of a diffraction order. It is conceivable to use the light source image of the $0^{th}$ diffraction order, that is to say undiffracted light source image. It is, however, also possible to use higher diffraction orders. A plurality of diffraction orders may also be used for generating the intensity distribution, for example in order to increase the precision of the measurement method, since a plurality of light source images can be detected. Owing to the predetermined grating period, the spacings of the maxima and/or minima in the intensity distribution can be predetermined very accurately. It is possible to predetermine the accuracy of the determination of the relative position of the first location in relation to the second location very accurately.

According to another configuration of the measurement method, the second location is an eye pupil of the observer, and the relative position of the first location in relation to the eye pupil of the observer is determined in the coordinate system of the camera. The eye pupils of the observer are very conspicuous points or regions on the face of the observer. They can therefore be recognized relatively simply by evaluation logic connected to the camera. Furthermore, the determination of the relative position of the first location in relation to the position of an eye pupil of the observer can make control possible as a function of the eye pupil position of the observer. In particular, observers who cannot otherwise be distinguished on physical grounds can benefit from this.

Furthermore, according to an exemplary embodiment of the measurement method, the first location is brought to coincide with a predeterminable region of the face of the observer, in particular with the eye pupil of the observer, by variation of the predetermined illumination. In this way, observer tracking can be carried out.

In the case of display devices which are intended to allow the observers genuine three-dimensional perception without auxiliary means, for example polarization glasses or shutter glasses, it may be advantageous not only to determine the relative position of the first location in relation to the second location, but to bring them directly to coincide. In this way, it can become possible to deliberately illuminate only a predeterminable region of the face of the observer when playing film scenes, for example. In this way, the computation outlay for the calculation of the three-dimensional representation can be reduced.

According to another refinement of the measurement method, an image to be displayed to the observer is used as the intensity distribution of the illumination light in a plane of a light source image or as a light source image.

The use of the image to be displayed to the observer can make it possible to carry out the measurement method even when it is used as a display device for the observer. When a display device representing three-dimensional scenes is involved, the representation may be adapted to a varying position of the observer.

According to another configuration of the measurement method, the second location of the object is defined by predetermined illumination by means of the display device with a second intensity distribution of the illumination light in a plane of a second light source image.

The distance between the first location of the object and the second location can in this way be known in the coordinate system of the display device, and the position and orientation of the camera in relation to the display device can therefore be determined from the relative distance of the first location in relation to the second location in the coordinate system of the camera.

The second intensity distribution of the illumination light in the plane of the second light source image may have a light source image of a diffraction order. The use of diffraction orders as light source images can have the advantage that their distances, or the underlying diffraction angles, can be predetermined in a fixed way by a raster of the display device. The reproducibility of the method can therefore be improved.

Furthermore, according to an exemplary embodiment of the measurement method, a predeterminable pattern is formed on the object, in particular the face of the observer, with the first and second intensity distributions of the illumination light, an image of the pattern is recorded with the camera, and the recorded image of the pattern is examined for differences from the predeterminable pattern.

By determining the differences from the predeterminable pattern, it is conceivable to determine the shape of the object. It may also be possible to determine whether the object corresponds to a predetermined object or to a different object.

According to another refinement of the measurement method, a first diffraction order is used as the first light source image and a different diffraction order is used as the second light source image.

The use of defined diffraction orders as light source images can have the advantage that their distance can be predetermined in a fixed way by a raster of the display device, so that the measured relative positions can be attributed to absolute positions. The diffraction pattern is given by the raster of the display device, or of a controllable spatial light modulator of the display device, the wavelength of the light used, or the wavelengths used, and the distance to the illuminated plane, i.e. the distance to the illuminated object.

According to another configuration of the measurement method, a calibrated object is used. A calibrated object is intended to mean an object having a sufficiently accurately known shape. From the determination of the relative position of the first location of the object in relation to the second location of the calibrated object in the coordinate system of the camera, the position and orientation of the camera can be determined with improved accuracy in relation to the coordinate system of the display device.

Furthermore, according to an exemplary embodiment of the measurement method, the coordinate system of the camera is calibrated in relation to a coordinate system of the display device from the relative position of the first location in relation to the second location in the coordinate system of the camera.

The calibration of the coordinate system of the camera can make it possible to obviate continuous determination of the relative position, since the position of the second location of the object in the coordinate system of the display device can also be determined without having to mark a first location of the object by predetermined illumination. Calibration is only necessary at relatively large distances, when the orientation and/or position of the camera have been altered. Calibration may, in particular, be necessary after transport of the apparatus. It is conceivable to carry out the calibration at predetermined time intervals. It may, however, also be envisioned to carry out the calibration only in response to explicit requirement by the observer.

According to another refinement of the measurement method, the camera is arranged at a predetermined distance and/or in a predetermined orientation with respect to the display device, and the position of the second location in a coordinate system of the display device is determined from the relative position of the first location in relation to the second location in the coordinate system of the camera. In this way, in particular, the shape of the object can be determined.

According to another configuration of the measurement method, the first light source image and the second light source image is generated by an optical system of the display device and by predetermined illumination of a controllable spatial light modulator with light of a first visible wavelength and/or a second visible wavelength and/or a third visible wavelength and/or an infrared wavelength, and the camera and/or a further camera is provided with a filter which is transmissive essentially only for light of the first visible wavelength and/or the second visible wavelength and/or the third visible wavelength and/or infrared wavelength.

By the use of light of a defined wavelength and of a corresponding filter, the signal-to-noise ratio can be improved. In particular, an influence of ambient light on the measurement result can be reduced. The use of a filter which is transmissive for light of infrared wavelength can be advantageous, in particular, when recording the observer. For example, the position of the eye pupils of the observer may possibly be simpler to determine when the filter of the camera transmits only light of infrared wavelength.

Typically, with display devices of the type described here, the observers are shown colored light source images which are formed by light of three wavelengths. By the use of all three wavelengths, the accuracy of the measurements can be improved.

Furthermore, according to another exemplary embodiment of the measurement method, the relative position of the first location in relation to the second location is determined in a second coordinate system of a second camera.

By the use of a second camera, in addition to information about the directions in which the first location of the object and the second location of the object lie, it is also possible to obtain information about the distance of the first and second objects from the display device. Further cameras may possibly further improve the spatial resolution.

According to another exemplary embodiment of the measurement method, by predetermined illumination by means of a display device, in particular a holographic or autostereoscopic display device, with an intensity distribution of the illumination light in a plane of a light source image, a first location of an observer of the display device is marked, a viewing window of an image to be displayed to the observer is used as the intensity distribution of the illumination light in a plane of a light source image or as a light source image, the relative position of the first location in relation to the eye pupil of the observer is determined in the coordinate system of the camera, and the first location is brought to coincide with a predeterminable region of the face of the observer, in particular with the eye pupil of the observer, by variation of the predetermined illumination. The measurement method may be carried out for both eye pupils. The observer may be provided with specific image information for each eye pupil. In this way, for example, a particularly good depth impression can be imparted. Furthermore, the viewing window may be tracked continuously to the position of the eyes, so that it is possible to avoid light images of higher diffraction orders from being picked up by the eye pupils.

On the other hand, the object mentioned above is achieved by an apparatus for carrying out the measurement method, wherein the apparatus comprises a display device, a camera and an evaluation unit for determining the position of the first location in a coordinate system of the camera.

The advantages associated with such a display device, in particular with a holographic display device or an autostereoscopic display device, have already been described above in relation to the method according to the invention.

According to a first refinement of the apparatus, the camera comprises a CCD sensor.

CCD sensors can have a particularly large dynamic range, that is to say record both very bright and very dark regions of the image region.

As an alternative, the camera may also comprise a CMOS sensor. In general, CMOS sensors have a larger dynamic range than CCD sensors, CCD sensors generally having a higher bit depth in comparison with CMOS sensors. CMOS sensors can typically also record long-wavelength infrared light.

The camera could also be a color camera. By the additional use of color information, the accuracy of the relative position determination can be improved further.

Furthermore, according to an exemplary embodiment of the apparatus, the apparatus comprises a light source and an optical system, and an intensity distribution of the illumination light in a plane of a light source image can be generated with the light source and the optical system.

According to the present invention, with the aid of an intensity distribution of the illumination light imaged or projected onto an object, a reliable relative position of the first location of the object to a second location of the object can be determined in a coordinate system of a camera, the second location being the eye pupil of the observer.

So that the signal-to-noise ratio can be increased, according to a preferred embodiment at least one narrow bandpass filter could be used. The transmission characteristic of a triple bandpass filter is shown in FIG. 5. In this case, the transmission is plotted as a function of the wavelength of the light used. The transmission can be optimized in such a way that it respectively acts for a plurality of narrowband spectral ranges. Accordingly, it is possible to use corresponding spectral windows for example for (457±3) nm, (532±3) nm, (640±3) nm and/or (780±5) nm. Such spectral filters are now already mass products, the main field of use of which is in fluorescence light microscopy or in color-separated three-dimensional representation of objects. It is also possible to use merely one infrared wavelength, for example 780 nm, in order to be employed as an invisible component. This is because light with a wavelength of 780 nm can only be seen with high intensities. It is thus possible to use a narrow spectral window in the near-infrared range or in the infrared range. The ambient light can be suppressed by a factor of, for example, >200.

Advantageously, it is furthermore possible, for example, to use infrared line scanning (i.e. a line raster) with the use of an additional subsystem of the measurement method according to the invention.

The detection or determination of the eye position may be carried out with the aid of a CMOS array or a CMOS line. A retina scan in this case constitutes a rapid possibility for tracking the eye position. This may be implemented with the use of a near-infrared LED, which produces a predetermined spatial correlation. Accordingly, the position of an eye or a pupil can correlate with a predefined or predetermined illumination function.

According to a first exemplary embodiment in this regard, a plurality of light sources could be used, the light of which is emitted in different directions. Accordingly, it is possible to illuminate the heads of a plurality of observers and the eyes from different directions. The different illumination directions may be switched on and off, namely for example by switching light sources of different directions on and off. This may be done sequentially or simultaneously, for example sequentially in the case of illumination with light with essentially the same wavelength. If illumination light of different wavelengths is used, this could also be carried out simultaneously.

According to another exemplary embodiment in this regard, a scanning solution could be used. In this case, a scan (raster) may for example be carried out in one direction or in two, three or more different directions. Each one-dimensional scan (i.e. each raster of a light beam along an essentially rectilinear line) gives an increase in the retina reflection signal. Here as well, the use of a narrowband spectral filter may be employed in order to separate the light source of the scanner from the ambient light and therefore increase the signal-to-noise ratio of the detected signal.

The evaluation or determination of the position of the eyes may be carried out sequentially, for example in two different directions. Accordingly, the x and y positions of the eye, or of the eye pupil, may for example be determined within 1/1000 of a second, when a CMOS line detector is used.

It is furthermore possible to implement different scan methods. For example, global scans may be carried out, for example in the x and y directions or in crossed directions. Angle-dependent scans may also be implemented. Furthermore, an α and β angle scan may be used in order to determine direction-dependent sections of the angle scanning lines. A plurality of scanning methods may be combined, in order to reduce or exclude possible uncertainties in the position determination.

In addition to this, a scan region may be defined or established. This scan region may be substantially smaller than the overall scan region.

Accordingly, the scans may be carried out in these reduced scan regions, so that the scan speed and the eye detection can be carried out more rapidly.

Specifically, in one exemplary embodiment, a line scanner arranged in the x direction, or in the horizontal direction, could be provided on one side of the display device and a linear detector or a (two-dimensional) detection matrix could be arranged on the other side of the display device. It is furthermore possible to provide line scanners and detectors on both sides of the display device. A comparable arrangement may be provided on the upper and lower sides of the display device, for example in order to implement a y scan.

A cost-efficient solution could, for example, be carried out in that a DOE (diffractive optical element) is arranged in front of an IR-LED (infrared light-emitting diode) and a one-dimensional scan mirror, the IR-LED and the one-dimensional scan mirror being arranged in a standard IC package which also contains all the electronic driving, in order to drive the small scanning mirror.

This detection principle could also be used in conjunction with an HMD (head-mounted display, a display adapted to an observer's head).

If, for example, one- or two-dimensional CMOS detector arrays are used, here again a restricted scan range may be selected so that signals can be detected from the restricted scan range and read out with an increased repetition rate. To this end, for example, it is possible to use a module for finding an observer's head, which only detects the position of the observer's head. These position data of the observer's head can then be used for the selected scan range, for example by using two one-dimensional scanners.

For example, a small region of 25 mm×25 mm or even substantially less could be used, this region being centered approximately on the middle of the eye pupil. This region, or this surface, is illuminated with the one-dimensional or two-dimensional line scan. Fast photodetector diodes may be arranged on the edge of the display device. These detectors may for example be provided with narrowband filters, which are tuned to the illumination wavelength—for example near-infrared light-emitting diodes. Accordingly, a rapid subsystem is thereby produced which can be used in the display device specifically when the display device is configured in the form of a direct-view device, an HMD or a mobile display or a tablet. The photodetectors or photodiodes may also have a specially tuned angle-dependent direction characteristic, which detect in particular light from predetermined spatial regions or tracking regions.

In this way as well, the amount of light which does not come from the scan range, or the detection range, can be reduced.

According to another refinement of the apparatus, the apparatus comprises a filter, which is arranged in front of the first camera and is transmissive essentially only for light of a first visible wavelength and/or a second visible wavelength and/or a third visible wavelength and/or infrared wavelength.

The associated advantages have already been described above with reference to the method according to the invention.

BRIEF DESCRIPTION OF THE DRAWINGS

Further configurations will now be explained in more detail with the aid of the drawing. In the schematic drawing.

DETAILED DESCRIPTION OF THE INVENTION

Figure 1:
FIG. 1 shows a flow chart according to an exemplary embodiment of the measurement method according to the invention.

FIG. 1 shows a flow chart according to an exemplary embodiment of the measurement method according to the invention in a schematic representation.

In a first step 1, an object is illuminated by predetermined illumination by means of a display device, and a first location of an object is marked by the intensity distribution of the illumination light in a plane of a light source image.

In a second step 2, the relative position of the first location in relation to a second location of the object is determined in a coordinate system of a camera.

Figure 2:
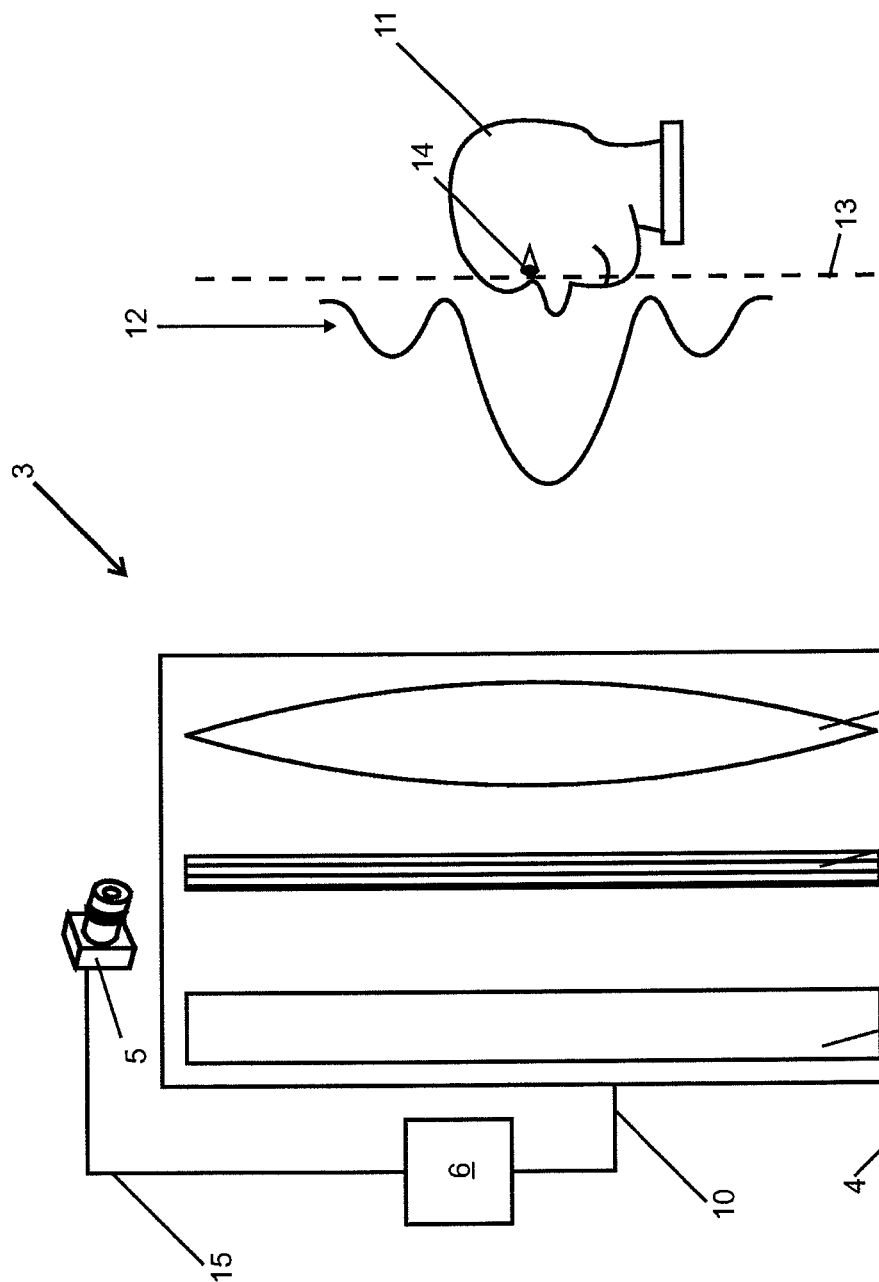
FIG. 2 shows an apparatus for carrying out the measurement method according to an exemplary embodiment according to the invention.

FIG. 2 shows an exemplary embodiment of an apparatus 3 according to the invention. The apparatus 3 comprises a display device 4, a camera 5 and an evaluation unit 6. The display device contains a light source 7, a spatial modulator for light 8 and an optical system 9.

If a light source of small extent is expanded onto a large area, which is denoted by 7 in FIG. 2, then an optical system which has a focusing effect at least in one direction generates at least in one direction a light source image which, for example, lies close to the plane 13. If 7 is a luminous surface, then in 13 there is an intensity distribution which is proportional to the plane wave spectrum of the luminous surface. A spatial modulator may in this case introduce diffraction broadening.

Spatial modulators for light 8 are also known by the term spatial light modulator, or the abbreviation SLM, and are used to impose a spatial modulation on light. Typically, SLMs modulate the intensity of the light. Nevertheless, SLMs which modulate the phase are also known, and it is furthermore conceivable to modulate the phase and the intensity simultaneously with an SLM.

In the exemplary embodiment shown, the display device 4 is driven by the evaluation unit 6 via a connection 10 and the illumination with which the display device 4 illuminates an object 11 is predetermined. In the present case, the object 11 is an observer of the display device 4. By means of the predetermined illumination, an intensity distribution of the illumination light 12 is generated in a plane of a light source image 13, and a first location of the object 11 is thereby marked.

In general, the intensity distribution generated by the display device in the plane 13 may be much smaller than in FIG. 2. It may, for example, involve a viewing window which has a dimension of 10 mm×10 mm, or even only a diameter of 3 mm.

With the camera 5, the intensity distribution of the illumination light 12 in the plane of the light source image 13 is recorded and the first location of the object is recorded with the camera 5. The camera 5 likewise records a second location of the object 11, here the eye pupil 14 of the observer. From the data provided by the camera 5 via the connection 15, the evaluation unit 6 then determines the relative position of the first location in relation to the second location of the object 11 in the coordinate system of the camera 5.

Figure 3:
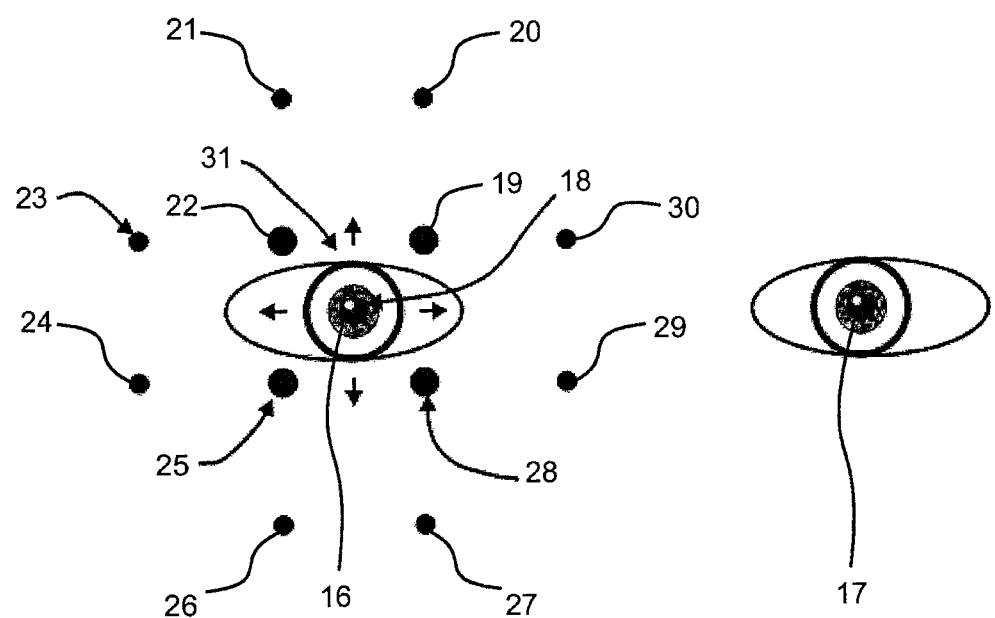
FIG. 3 shows, in a plane of the light source images, the position of the eyes of an observer relative to the light source images of the illumination light, the plane of the light source images in this exemplary embodiment being arranged parallel to the surface of the controllable spatial light modulator.

FIG. 3 shows the position of the eyes 16 and 17 of an observer, whose face (not shown in FIG. 3) is illuminated by means of a display device (not shown in FIG. 3), in particular a holographic or autostereoscopic display device. During the illumination of the observer with the display device, the intensity distribution of the illumination light frequently has light source images of a plurality of diffraction orders 18-30. FIG. 3 shows diffraction orders 18-30 which were obtained by means of two-dimensional encoding and are represented as black circular areas. The undiffracted light source image 18 is denoted as the light source image of the $0^{th}$ diffraction order. The region which comprises the undiffracted light source image 18, and extends as far as the closest lying light source images 19-22 of higher diffraction order, is referred to as the viewing window 31. The viewing window 31 is outlined as an ellipse in FIG. 3. Light source images lying further away from the viewing window 31 may, for example, be reduced in their intensity by a cosinusoidally extending apodization profile of the pixels of the controllable spatial modulator, as described for example in WO 2009/156191 A1. If, as shown in FIG. 3, the viewing window 31 coincides with the position of the eye 16, then the other light source images can be suppressed to such an extent that they are no longer perceptible to the other eye 17. So that this can be done even in the event of movement of the eyes, the illumination is typically adapted continuously to the position of the eyes. The eye movements to be taken into account for this are indicated by four short arrows in FIG. 3.

Figure 4:
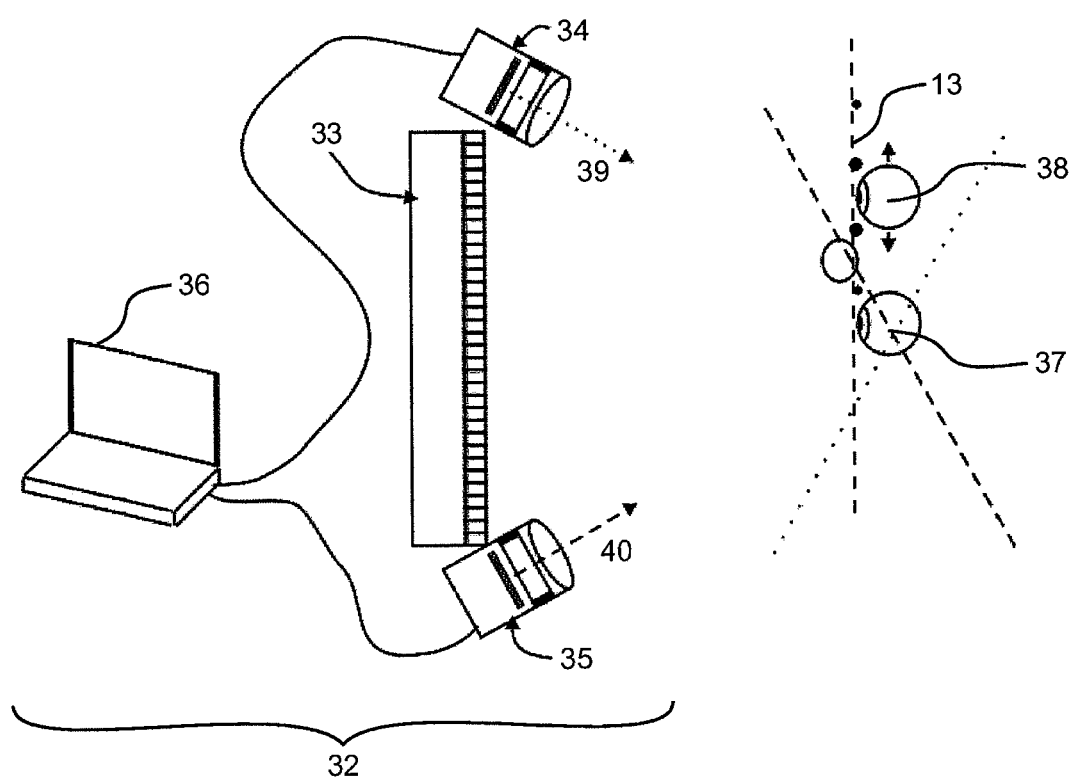
FIG. 4 shows a plan view of an exemplary embodiment of the apparatus for carrying out the measurement method according to the invention and the eyes of an observer.
Figure 5:
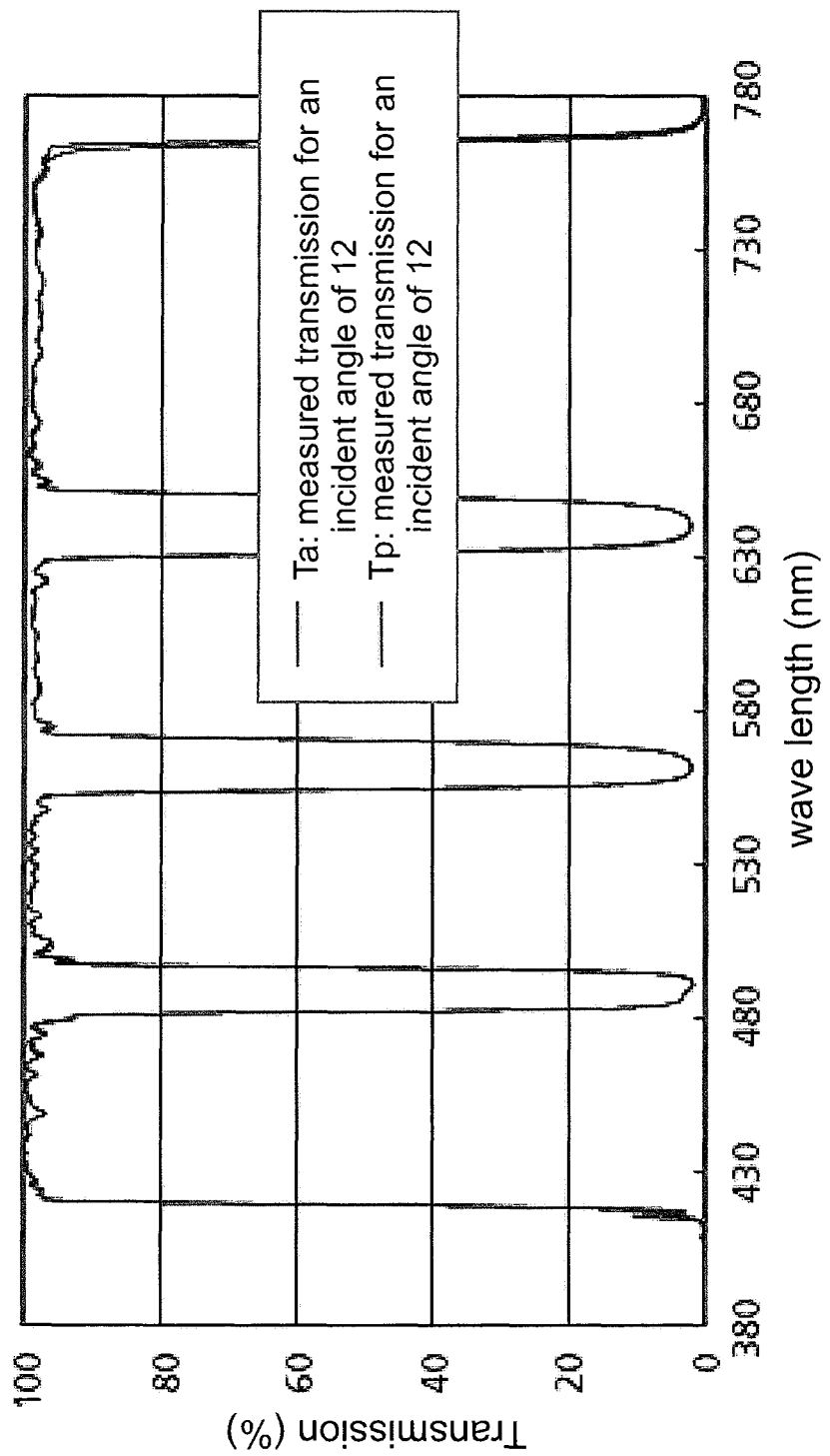
FIG. 5 shows the transmission characteristic of a triple bandpass filter in a diagrammatic representation.

FIG. 4 shows another exemplary embodiment of an apparatus 32 according to the invention. The apparatus 32 comprises a display device 33, two cameras 34, 35 and an evaluation unit 36. The orientation and positioning of the two cameras 34, 35 in relation to the display device 33 are predetermined in a fixed way by the mounting. In other words, the coordinate systems of the two cameras 34, 35 are calibrated.

The space in front of the apparatus 32, in which the observer is located, is recorded by the two cameras 34, 35, the face of the observer being recognized with the aid of the camera images. The position of the eye pupils 37, 38 is determined in the calibrated coordinate system of the respective camera 34, 35. In this way, two direction vectors 39, 40 are first obtained for the eye pupil 37, which extend from the position of the cameras 34, 35 and point in the direction of the eye pupil 37. From the point of intersection of the straight lines spanning the two direction vectors 39, 40, it is then possible to determine the distance of the eye pupil 37 from the display device 33, or the relative position between the eye pupil 37 and the display device 33. The same procedure is carried out with the second eye pupil 37.

During transport of the apparatus 32, it may occur that the position of the cameras 34, 35 or their orientation with respect to the display device 33 is unintentionally altered. The coordinate system thereof is therefore no longer calibrated in relation to the display device 33.

The distances of the light source images generated on an object (cf. FIG. 3) may be predetermined in a fixed way by the native pixel raster of the display device 33, e.g. as a Fourier transform of the controllable spatial light modulator, in particular when a display device according to WO 2006/066919 A1 is used, or the measurement method according to the invention is applied to a display device as disclosed in WO 2006/066919 A1. For calibration of the device 32, the light source images of a plurality of diffraction orders 18-30, that is to say the light source image raster, may be recorded with the respective camera 34, 35, and the position of the object may be determined from the relative position of the light source images in the respective coordinate system of the camera 34, 35. Since the position of the light source images in relation to the display device 33 is known, the apparatus can therefore be recalibrated.

The invention claimed is:

1. A measurement method for determining a distance of a light intensity distribution to an object comprising:
    generating the light intensity distribution in a light source image plane, in which the object is located, by a display device through a viewing window, where the light intensity distribution in the light source image plane comprises a light source image, wherein the light intensity distribution is brought to coincide with a predeterminable region of the face of the observer, in particular with the eye pupil of the observer,
    recording the generated light intensity distribution and the object by a camera, and
    determining from data provided by the camera the distance of the generated light intensity distribution to the object by an evaluation unit.

2. The measurement method as claimed in claim 1, wherein the intensity distribution in the light source image plane comprises a light source image of a diffraction order.

3. The measurement method as claimed in claim 1, wherein the object is an observer, and the distance of the light intensity distribution to the observer is determined in a coordinate system of the camera.

4. The measurement method as claimed in claim 1, wherein the light intensity distribution is brought to coincide with the predeterminable region of the face of the observer, in particular with the eye pupil of the observer, by variation of an illumination provided by the display device.

5. The measurement method as claimed in claim 1, wherein the location of the object is defined by illumination provided by the display device with a second intensity distribution in a second light source image plane.

6. The measurement method as claimed in claim 5, wherein a predeterminable pattern is formed on the object, in particular the face of the observer, with the first and second intensity distributions, where an image of the pattern is recorded with the camera, and where the recorded image of the pattern is examined for differences from the predeterminable pattern.

7. The measurement method as claimed in claim 5, wherein a first diffraction order is used as the first light source image and a different diffraction order is used as the second light source image.

8. The measurement method as claimed in claim 1, wherein a calibrated object is used.

9. The measurement method as claimed in claim 5, wherein a coordinate system of the camera is calibrated in relation to a coordinate system of the display device from the relative position of the light intensity distribution to the object in the coordinate system of the camera.

10. The measurement method as claimed in claim 1, wherein the camera is arranged in at least one of: at a predetermined distance and in a predetermined orientation, with respect to the display device, and wherein the position of the object in a coordinate system of the display device is determined from the distance of the light intensity distribution to the object in the coordinate system of the camera.

11. The measurement method as claimed in claim 1, wherein at least one of the first light source image and the second light source image is generated by the optical system of the display device and by illumination of a controllable spatial light modulator with light of at least one of a first visible wavelength and a second visible wavelength and a third visible wavelength and an infrared wavelength, and wherein at least one of the camera and a further camera is provided with a filter which is transmissive essentially only for light of at least one of the first visible wavelength and the second visible wavelength and the third visible wavelength and infrared wavelengths.

12. The measurement method as claimed claim 1, wherein the distance of the light intensity distribution to the object is determined in a second coordinate system of a second camera.

13. The measurement method as claimed in claim 4, wherein the distance of the light intensity distribution to the eye pupil of the observer is determined in the coordinate system of the camera, wherein the light intensity distribution is brought to coincide with a predeterminable region of the face of the observer, in particular with the eye pupil of the observer, by variation of the illumination provided by the display device.

14. The measurement method as claimed in claim 1, wherein the light intensity distribution is brought to coincide with the predeterminable region of the face of the observer, in particular with the eye pupil of the observer, by variation of an illumination generated by the display device by constructive or destructive interference of coherent light beams.

15. An apparatus for carrying out a measurement for determining a distance of a light intensity distribution to an object, wherein the apparatus is adapted and configured to:
generate a light intensity distribution in a light source image plane, in which the object is located, by a display device through a viewing window, where the light intensity distribution in the light source image plane comprises a light source image, wherein the light intensity distribution is brought to coincide with a predeterminable region of the face of the observer, in particular with the eye pupil of the observer,
record the generated light intensity distribution and the object by a camera, and
determine from data provided by the camera the distance of the generated light intensity distribution to the object by an evaluation unit,
wherein the apparatus comprises the display device, at least one camera and the evaluation unit.

16. The apparatus as claimed in claim 15, wherein the camera comprises a CCD sensor or a CMOS sensor or wherein the camera is a color camera.

17. The apparatus as claimed in claim 15, which comprises a light source, where an intensity distribution in a light source image plane can be generated with the light source and the optical system.

18. The apparatus as claimed in claim 15, wherein the apparatus comprises a filter, wherein the filter is arranged in front of the camera, and wherein the filter is transmissive essentially only for light of at least one of a first visible wavelength and a second visible wavelength and a third visible wavelength and infrared wavelength.

* * * * *